(12) United States Patent
Korte

(10) Patent No.: US 11,787,638 B2
(45) Date of Patent: Oct. 17, 2023

(54) PACKAGING MACHINE AND APPARATUS AND METHOD FOR ROUTING A TRANSPORT SECTION OF A PACKAGING MACHINE

(71) Applicant: ILLINOIS TOOL WORKS INC., Glenview, IL (US)

(72) Inventor: Hartmut Korte, Bramsche (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 19 days.

(21) Appl. No.: 17/526,599

(22) Filed: Nov. 15, 2021

(65) Prior Publication Data

US 2022/0153526 A1 May 19, 2022

(30) Foreign Application Priority Data

Nov. 17, 2020 (EP) .................................... 20208124

(51) Int. Cl.
*B65G 21/16* (2006.01)
*B65G 21/20* (2006.01)
*B65G 21/10* (2006.01)

(52) U.S. Cl.
CPC ......... *B65G 21/2072* (2013.01); *B65G 21/10* (2013.01); *B65G 2201/0235* (2013.01); *B65G 2811/0657* (2013.01); *B65G 2812/02069* (2013.01)

(58) Field of Classification Search
CPC .... B65G 21/10; B65G 21/16; B65G 21/2072; B65G 2201/0235

USPC ....................................................... 198/836.1
See application file for complete search history.

(56) References Cited

U.S. PATENT DOCUMENTS

| 3,038,584 | A | * | 6/1962 | Lagsdin | ............. | B65G 21/2072 |
| | | | | | | 198/599 |
| 5,167,319 | A | * | 12/1992 | McMackin, Jr. | ...... | B65G 47/66 |
| | | | | | | 198/599 |
| 5,211,280 | A | * | 5/1993 | Houde | ............... | B65G 21/2072 |
| | | | | | | 198/836.3 |
| 6,287,045 | B1 | | 9/2001 | Ledingham et al. | | |
| 6,334,525 | B1 | * | 1/2002 | Collins | .............. | B65G 21/2072 |
| | | | | | | 198/442 |
| 6,378,695 | B1 | | 4/2002 | Rinne | | |
| 7,431,150 | B2 | * | 10/2008 | Ranger | .................. | B65G 21/10 |
| | | | | | | 198/840 |

(Continued)

FOREIGN PATENT DOCUMENTS

DE 10 2015 006 979 A1 12/2016
GB 1 372 455 A 10/1974

*Primary Examiner* — Douglas A Hess
(74) *Attorney, Agent, or Firm* — Pauley Erickson & Swanson

(57) ABSTRACT

A packaging machine for packaging and/or processing objects, having a transport section (1) for conveying products, containers, and/or packaging units in a transport direction (2), wherein the transport section (1) has a conveying device (3), in the form of a conveyor belt, having preferably at least one drive means. For routing the transport section (1), at least in certain regions or portions an effective width of the conveying device (3), as viewed perpendicularly to the transport direction (2), for conveying the products, containers, and/or packaging units is preferably variably settable, at least over a predetermined or predeterminable region.

12 Claims, 1 Drawing Sheet

(56) References Cited

U.S. PATENT DOCUMENTS

| | | | | |
|---|---|---|---|---|
| 7,530,453 | B2* | 5/2009 | Ingraham | B65G 21/2072 198/817 |
| 8,186,503 | B1* | 5/2012 | Burchell | B65G 21/2072 198/836.3 |
| 8,490,780 | B2* | 7/2013 | Bell | B65G 21/2072 198/836.3 |
| 8,668,073 | B2* | 3/2014 | Petrovic | B65G 47/31 198/452 |
| 8,695,787 | B2* | 4/2014 | Bell | B65G 21/2063 198/836.3 |
| 9,073,698 | B2* | 7/2015 | Huettner | B65G 21/2063 |
| 10,087,012 | B1* | 10/2018 | Layne | B65G 21/2072 |
| 2013/0075236 | A1 | 3/2013 | Bell et al. | |
| 2020/0079593 | A1 | 3/2020 | Layne et al. | |

* cited by examiner

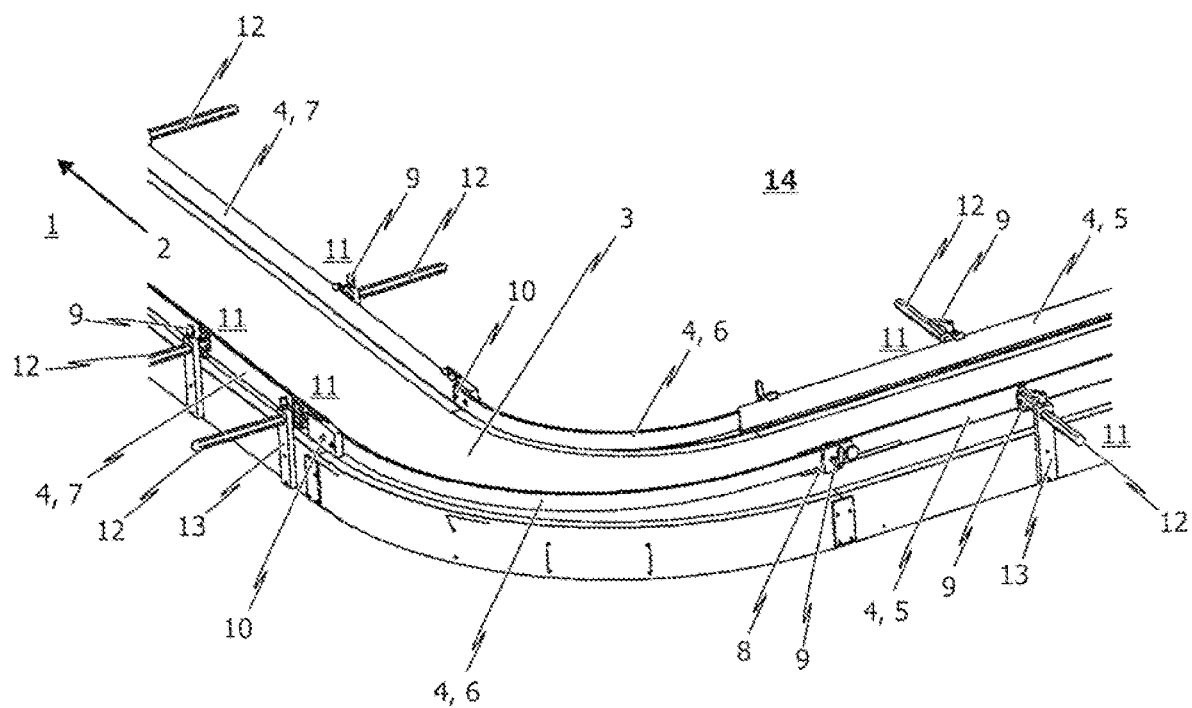

PACKAGING MACHINE AND APPARATUS AND METHOD FOR ROUTING A TRANSPORT SECTION OF A PACKAGING MACHINE

CROSS REFERENCE TO RELATED APPLICATION

European Patent Application No. EP 20 208 124.6, filed 17 Nov. 2020, the priority document corresponding to this invention, to which a foreign priority benefit is claimed under Title 35, United States Code, Section 119, and its entire teachings are incorporated, by reference, into this specification.

BACKGROUND OF THE INVENTION

Field of the Invention

The present invention relates to a packaging machine for packaging and/or processing objects.

SUMMARY OF THE INVENTION

In particular, the invention preferably (but not exclusively) relates to so-called secondary packaging machines which are configured in order to produce packages, in particular large packages (containers), namely in that the objects, in particular already packaged products that are assembled in a container, are enclosed in cardboard and/or film material.

The term "packaging machine" as used herein includes, in particular, the term "grouping device" in and of itself and as part of a larger system. For example, the packaging machines are a part of a filling line that is generally disposed within a production hall.

Individually packaged products, such as beverages filled in cartons or flour packed in bags or the like, are then gathered together into larger containers for better transport. For this purpose, the products are conveyed together in a packaging machine and are gathered into groups of a desired size by corresponding control of the conveyor or transport belts. Such a container can then be realized, for example, by filling a plurality of products into a package of cardboard or by wrapping it in film, which is subsequently shrunk so that the container becomes stable.

For the processing, gathering, grouping, and packaging of objects, different packaging machines or packaging stations are used, in particular, which are interconnected via a corresponding transport section in order to feed the products, containers, and/or packaging units in and out accordingly. The transport section is used in order to convey the products, containers, and/or packaging units in a preferably horizontal transport direction, wherein the transport direction often does not run straight, but rather has curved regions or bent or arcuate regions. The transport section has a conveying device in particular in the form of a transport or conveyor belt with preferably at least one drive means for driving the conveying device. However, it is not mandatory that a drive means be assigned to the conveying device (i.e., in particular the transport or conveyor belt).

In the design and planning of the packaging machine, the transport section must be routed accordingly. The term "routing" describes the design and definition of the line management of the transport section, in particular in plan view and cross-section.

The transport section must preferably be routed in such a way that a rectilinear region of the transport section transitions into a bent or arcuate region of the transport section as softly as possible in order to enable a transition as smoothly as possible between the rectilinear region and the bent or arcuate region of the transport section during transport of the products, containers, and/or packaging units. Thus, corresponding transition arcs, in particular in the form of curve guides, must be provided in the transition region between a rectilinear portion of the transport section and an arcuate or bent portion of the transport section.

However, it must be taken into account here that the arc shape of the curve guide also depends on the products, containers, and/or packaging units to be conveyed and in particular their size and shape. This makes it difficult to optimally route the transport section of a packaging machine already in the design or planning phase. Thus, the lateral guides and, in particular, the lateral curve guides of a transport section of a packaging machine are generally not adjusted until after startup of the packaging machine or during the initial startup of the packaging machine.

It must be taken into account that the transport section generally must be further modified when a product change takes place after the start-up of the packaging machine. The associated adjustment and setting of the lateral guides and, in particular, the curve guides of the transport section is relatively time-consuming, and often an optimal adjustment of the lateral guide or curve guide to the products, containers, and/or packaging units to be conveyed is not possible.

On the basis of this situation, the problem of the invention is to specify a solution that can be used in a particularly straightforward but effective manner in order to ensure that the transport section can also be routed as optimally as possible after the fact, i.e., after start-up of the packaging system. This problem is solved in particular by the subject invention.

Accordingly, the invention relates in particular to a packaging machine for packaging and/or processing objects, having a transport section for conveying products, containers, and/or packing units in a transport direction, wherein the transport section has a conveying device, in particular in the form of a transport or conveyor belt, having preferably at least one drive means.

According to one aspect of the present invention, it is in particular provided that, in particular for routing the transport section, at least in certain regions or portions an effective width of the conveying device, as viewed perpendicularly to the transport direction, for conveying the products, containers and/or packing units is preferably variably settable, in particular at least over a predetermined or predeterminable region.

Alternatively or additionally, it is in particular provided that the transport section preferably extends at least substantially horizontally, wherein the transport section has at least one curved region or at least one bent or arcuate region through which the products, containers and/or packing units are diverted and/or deflected in the horizontal direction. In particular for routing the transport section, it is provided here that, at least in certain regions or portions, a longitudinal inclination, a curvature, and/or a change of curvature of the at least one curved region or of the at least one bent or arcuate region of the transport section are/is preferably variably settable, in particular at least over a predetermined or predeterminable region.

The advantages achievable with the solution according to the invention are obvious: in that, optionally or as needed, at least in certain regions or portions an effective width of the conveying device, as viewed perpendicularly to the transport direction, for conveying the products, containers and/or packing units is preferably variably settable, the transport section is easily flexible and in particular optimally adapted to the respective properties and in particular sizes of the products, containers, and/or packaging units intended for conveyance. This relates on the one hand to a rectilinear region of the transport section.

In order to be able to additionally optimally adjust a curve guide of the transport section to the properties and in particular sizes of the products, containers, and/or packaging units to be conveyed, it is provided according to one aspect of the invention that at least in certain regions or portions a longitudinal inclination, a curvature and/or a change of curvature of the at least one curved region or of the at least one bent or arcuate region of the transport section are/is preferably variably settable, in particular at least over a predetermined or predeterminable region.

In this way, it is thus ensured that, even after a product change, the transport section is optimally routed or can be routed in a simple manner, and that in particular a fault-free transport or a fault-free conveyance of the products, containers, and/or packaging units is ensured, wherein the required routing, i.e. adjustment, of the transport section in particular to the products, containers, and/or packaging units to be conveyed is enabled in an easily implemented but nevertheless effective manner.

According to implementations of the packaging machine according to the invention, it is provided that the transport section is assigned at least one lateral guide element, in particular in the form of a guide rail or guide strip, which is adjustable, at least relative to the conveying device. i.e., relative to the transport or conveyor belt, and perpendicularly to the transport direction, in order to be able to vary and set the effective width of the conveying device for conveying the products, containers, and/or packaging units optionally or as needed.

In particular, according to further developments of the last mentioned aspect, it is provided that the at least one lateral guide element has a preferably flexurally rigid first region, in which the lateral guide element runs at least substantially rectilinearly and serves as a lateral guide there.

Preferably, the at least one lateral guide element has a further, second region, in which the lateral guide element runs arcuately, wherein the second region of the lateral guide element is formed, at least in certain regions, from a material, in particular plastics material, of such flexibility that, at least in certain regions or portions, a curvature and/or change of curvature (gradient) of the arcuate shape of the second region is variably settable, preferably reversibly, and in particular at least over a predetermined or predeterminable region.

As used herein, the term "flexurally rigid" refers to the behavior of the first region of the lateral guide element under the typically applied load. In particular, it should be understood that diversion or deflection of the lateral guide element is not necessary or desired in the use of the packaging machine, as the first region of the lateral guide element serves as a rectilinear guide, i.e., not as a curve guide in a curved region or arcuate region of the transport section.

By contrast, the second region of the lateral guide element is configured in order to be correspondingly flexible so that the curvature and/or curvature change of the arch shape of the second region can be variably adjusted at least over a predetermined or predeterminable region.

For example, a plastic material which has correspondingly flexible properties can be used as a material for the second region of the lateral guide element. For the material of the first region of the lateral guide element, stainless steel is preferred.

Naturally, however, other materials for the first and/or second region of the lateral guide element can also be considered.

Preferably, a bearing is provided between the first region or between an end region of the first region adjacent to the second region of the at least one lateral guide element and the second region or an end region of the second region adjacent to the first region of the lateral guide element in order to mechanically connect these two regions and the corresponding end regions to one another.

According to implementations of the bearing, it is provided that it is configured as a sliding or linear bearing and is designed, at least in certain regions, to guide or to allow a rectilinear movement between the end region of the first region of the lateral guide element and an end region of the second region of the lateral guide element in the longitudinal direction of the lateral guide element. Preferably, this bearing, which is preferably embodied as a sliding or linear bearing, has only a single degree of freedom, namely in the longitudinal direction of the lateral guide element.

In this regard, it lends itself that the bearing is associated with an arresting device for optionally and/or as-needed blocking of a movement of the end region of the first region and the end region of the second region relative to one another. Such an arresting device can be given in the form of a clamp or a screw, for example.

According to further developments of the present invention, it is provided that the at least one lateral guide element has a preferably flexurally rigid third region, wherein the second region of the lateral guide element is arranged between the first and the third region of the lateral guide element.

In particular (but not exclusively) in the most recently mentioned embodiment, it is preferred that the first and/or third region of the lateral guide element are/is assigned at least one adjusting device via which, at least in certain regions or portions, the first and/or third region are/is adjustable relative to the conveying device and as viewed perpendicularly to the transport direction. In this way, an effective width of the conveying device, as viewed perpendicularly to the transport direction, for conveying the products, containers, and/or packing units can be variably set.

In addition, at least in certain regions or portions, a longitudinal inclination, a curvature and/or a change of curvature of a curved region or of a bent or arcuate region of the transport section is preferably variably settable, in particular at least over a predetermined or predeterminable region.

In the last mentioned further developments of the invention, in which the lateral guide element has the third region in addition to the first and second regions, an end region of the third region can also be connected to an end region of the second region via a sliding or linear bearing. Preferably, however, it is provided that an end region of the second region is fixedly connected to an end region of the third region.

According to preferred implementations of the present invention, the transport section of the packaging machine is assigned two mutually opposite lateral guide elements of the aforementioned type which, at least in certain regions, in particular independently of one another, are adjustable relative to the conveying device and perpendicularly to the transport direction for thus varying an effective width of the conveying device for conveying the products, containers and/or packaging units and/or for varying a curvature, a change of curvature, or the shape of a curved region of the transport section.

The invention is not limited to packaging machines having transport sections that are routable optionally or as needed in the manner described above. Rather, the invention generally also relates to an apparatus for routing a transport section of a packaging machine, wherein the transport section has a conveying device, in particular in the form of a conveyor belt, for conveying products, containers, and/or packaging units in a transport direction. In this case, the routing apparatus has at least one lateral guide element, in particular in the form of a guide rail or guide strip.

This lateral guide element is adjustable at least in regions or in sections relative to the conveying device and perpendicular to the transport direction in order to vary an effective width of the conveying device for conveying the products, containers, and/or packing units.

Preferably, the routing apparatus according to the invention has two mutually opposite lateral guide elements, which laterally limit the transport section of the packaging machine, and which are at least in regions, in particular, independently adjustable relative to the conveying device and perpendicular to the transport direction, in order to be able to vary the effective width of the conveying device for conveying the products, containers, and/or packing units as needed or optionally.

The at least one lateral guide element and/or the two lateral guide elements of the routing apparatus according to the invention each has/have a preferably flexurally rigid first region in which the lateral guide element extends at least substantially rectilinearly. The corresponding lateral guide element further has a second region in which the lateral guide element extends arcuately and serves as a curve guide therein. The second region of the lateral guide element is formed, at least in certain regions, from a flexible material, in particular plastics material, of such flexibility that, at least in certain regions or portions, a curvature and/or change of curvature of the arcuate shape of the second region is variably settable, preferably reversibly, and in particular at least over a predetermined or predeterminable region.

In particular, it is provided in this context that a first end region of the first region of the lateral guide element is mechanically connected to an end region of the second region of the second guide element such that these two end regions are movable relative to one another in the longitudinal direction of the lateral guide element.

According to preferred further developments of the routing apparatus according to the invention, the at least one lateral guide element has an in particular flexurally rigid third region, wherein the second region of the lateral guide element is arranged between the first and third region of the lateral guide element.

In this case, it is preferred that at least one adjusting device is associated with the first and preferably further associated with the third region of the lateral guide element, via which the first and preferably also third region of the lateral guide element are adjustable, at least in certain regions or portions, relative to the conveying device and as viewed perpendicularly to the transport direction.

In this way, not only the curvature, arc shape, and curvature change of the curvilinear region of the transport section is adjustable, but also a particularly smooth transition from the rectilinear regions, which form the first and third region of the lateral guide element, to the second arcuate region.

The invention further relates to a method for routing a transport section of a packaging machine, wherein the transport section has a conveying device, in particular in the form of a conveyor belt, for conveying products, containers and/or packaging units in a transport direction, preferably in a horizontal transport direction.

The routing method according to the invention uses the previously described routing apparatus according to the invention in order to optimally determine the individual regions of the transport section. In particular, it is provided that, at least in certain regions or portions, the first and/or third region of the at least one lateral guide element of the routing apparatus is/are adjusted relative to the conveying device and as viewed perpendicularly to the transport direction in such a way that, at least in certain regions or portions, a longitudinal inclination, a curvature and/or a change or curvature of at least one curve region or of at least one bent or arcuate region of the transport section and/or, at least in certain regions or portions, an effective width of the conveying device, as viewed perpendicularly to the transport direction, for conveying the products, containers, and/or packaging units is/are set.

BRIEF DESCRIPTION OF THE DRAWINGS

An exemplary embodiment of the routing apparatus according to the invention is described in the following with reference to the attached drawing.

The following are shown:

FIG. 1 is an isometric view of a region of a transport section of a packaging machine with an exemplary embodiment of the routing apparatus according to the invention.

DETAILED DESCRIPTION OF THE INVENTION

FIG. 1 shows schematically and in an isometric view a sub-region of a transport section 1 of a packaging machine or packaging system that serves the packaging and/or processing of objects. With the transport section 1, products, containers, and/or packaging units are transported or conveyed in a transport direction 2 indicated by the arrow in FIG. 1.

As can be seen from the illustration in FIG. 1, the portion of the transport section 1 shown therein has, when viewed in the transport direction 2 or conveying direction, an upstream rectilinear region, and, also in transport or conveying direction 2, a downstream rectilinear region, wherein these two rectilinear regions of the transport section 1 are connected to one another via a corresponding curved region or bent or arcuate region.

In particular, such a curved region or bent or arcuate region of the transport section 1 is to be adjusted upon start-up of the packaging machine or packaging system or in the event of a product change to the properties and/or size of the products, containers, and/or packaging units to be conveyed. In particular, it must be ensured that when transporting the products, containers, and/or packaging units, they are guided in a "gentle" manner by the bent or arcuate region of the transport section 1 in order to avoid disruptions in the conveyance of the products and/or damage to the products.

Here, particular attention must be paid to the transition of the curved region or bent or arcuate region into the rectilinear regions. It is particularly preferable in this context for the transition region to be designed in a Euler spiral fashion in order to ensure a continuous, jerk-free change in curvature between the rectilinear region and the circular or curved region of the transport section 1.

The transport section 1, of which certain portions are shown in FIG. 1, has a conveying device 3 in the form of a transport or conveyor belt, in particular in the form of an endless transport or conveyor belt, wherein a drive means (not shown in FIG. 1) for driving the conveying device 3 can be associated with the conveying device 3.

In order to be able to adjust the transport section 1 to the size and/or properties of the products/containers/packaging units to be conveyed during an initial start-up or during a product change, a corresponding routing apparatus 14 is used in the transport section 1, of which certain portions are shown in FIG. 1.

The routing apparatus 14 has two mutually opposite lateral guide elements 4, each of which is configured at least in certain regions as a guide rail or guide strip. The two lateral guide elements 4 limit in horizontal terms the effective width of the conveying device 3 for conveying the products, containers, and/or packing units. In other words, the lateral guide elements 4 serve as lateral guide rails.

In particular, it is provided that each lateral guide element 4 is subdivided into different regions.

Specifically, in the embodiment of the routing apparatus 14 according to the invention shown schematically in FIG. 1, it is provided that each lateral guide element 4 has a first rectilinear region 5, a second curved region 6 connected to the first (rectilinear) region 5, and a third rectilinear region 7 following the second (curved) region 6.

The first and third (rectilinear) region 5, 7 of the two lateral guide elements 4 is to preferably formed from a flexurally rigid material, in particular stainless steel, and serves as a lateral linear guide for the rectilinear portions of the transport section 1. By contrast, the central second region 6 of the respective lateral guide elements 4 is designed flexibly and is curved, in particular. Due to the flexible property of the material of the second region 6 of the lateral guide element 4, a curvature, a curvature profile, and a curvature change of the second region are variably adjustable.

For example, the second arcuate region 6 of the lateral guide elements 4 can be formed from a correspondingly flexible plastic material. Alternatively, however, as a second (arcuate) region 6 of the lateral guide elements 4, it is also conceivable to use a link chain consisting of individual flexurally rigid links, which are connected to one another pivotably, in particular about a vertical axis.

As indicated in FIG. 1, with the help of the two lateral guide elements 4, at least in certain regions or portions, an effective width of the conveying device 3, as viewed perpendicularly to the transport direction 2, for conveying the products, containers, and/or packaging units is preferably variably settable. The same is true with regard to a curvature and/or with regard to a curvature change of the two lateral guide elements 4 in the curved region and/or arcuate region of the transport section 1.

In detail, in the embodiment of the routing apparatus 14 according to the invention shown schematically in FIG. 1, it is provided that the first and third regions 5, 7 of the two lateral guide elements 4 are respectively adjustable relative to the conveying device 3 and perpendicular to the transport direction 2.

In this context, in particular, it is provided that on the one hand the first and third regions 5, 7 of each individual lateral guide element 4 are independently adjustable relative to the conveying device 3 and when viewed perpendicular to the transport direction 2.

On the other hand, it is provided that the respective regions (first and third regions 5, 7) of the two lateral guide elements 4 are also independently adjustable relative to the conveying device 3 and when viewed perpendicularly to the transport direction 2.

For this purpose, in the embodiment of the routing apparatus 14 according to the invention shown schematically in FIG. 1, it is provided that the first and third regions 5, 7, of the two lateral guide elements 4 are each associated with a respective adjusting device 11, with which, at least in certain regions or portions, the corresponding region 5, 7 of the respective lateral guide element 4 is adjustable and settable relative to the conveying device 3 and when viewed perpendicularly to the transport direction 2.

For example, as indicated in FIG. 1, the respective adjusting devices 11 have a horizontally adjustable setting plunger 12, which is connected to a region of the first or third region 5, 7 of the corresponding lateral guide element 4, and which is insertable and retractable in the direction of the conveying device 3, i.e. perpendicular to the transport direction 2, in order to suitably position the region of the first or third region 5, 7 of the corresponding lateral guide element 4.

The corresponding plunger 12 of the adjusting device 11 can be suitably supported via a bracket 13. In addition, it lends itself that an arresting device 9, in particular in the form of a fastening screw, is associated with the corresponding plunger 12 in order to fix a set position of the plunger 12 optionally or as needed.

It should be noted at this point that, instead of the manual adjustment of the corresponding regions 5, 7 of the lateral guide elements 4, a motorized, in particular electromotive, adjustment using, for example, at least one suitable step motor, etc. is also conceivable.

In the exemplary embodiment in FIG. 1, it is provided that an end region of the second region 6 of the lateral guide element 4 facing the third region 7 of the lateral guide element 4 is fixedly connected (for example, using a bolt or screw connection 10) to the corresponding end region of the third region 7 facing the second region 6 of the lateral guide element 4.

Further, in the illustrated embodiment of the routing apparatus according to the invention 14, it is provided that the end region of the second region 6 of the lateral guide element 4 facing the first region 5 of the lateral guide element 4 is connected via a bearing 8 to the end region of the first region 5 of the lateral guide element 4 facing the second region 6 of the lateral guide element 4.

This bearing 8 is, in particular, a sliding or linear bearing, which is configured in order to guide, at least in certain regions, a rectilinear movement between the end region of the first region 5 and the end region of the second region 6 of the lateral guide element 4 in the longitudinal direction of the lateral guide element 4.

Furthermore, an arresting device 9 is used, which is associated with the bearing 8 and serves to block a movement of the end region of the first region 5 and the end region of the second region 6 relative to one another, optionally or as needed.

In summary, it is found that, with the routing apparatus according to the invention 14, a transport section 1 and in particular a curvilinear region of a transport section 1 can be adjusted to the size and/or properties of the products to be conveyed in an easily implemented but nevertheless effective manner.

The invention is not limited to the exemplary embodiment of the routing apparatus 14 according to the invention shown in FIG. 1, but rather results when all of the features disclosed herein are considered together.

The invention claimed is:

1. A packaging machine for packaging and/or processing objects, having a transport section (1) for conveying products, containers, and/or packing units in a transport direction (2), wherein the transport section (1) includes a conveying device (3) in the form of a conveyor belt, having at least one drive means, the packaging machine comprising:
for routing the transport section (1), at least in certain regions or portions an effective width of the conveying device (3), as viewed perpendicularly to the transport direction (2), for conveying the products, containers, and/or packing units is variably settable, at least over a predetermined or predeterminable region, wherein the transport section (1) is assigned at least one lateral guide element (4), in the form of a guide rail or guide strip, which is adjustable, at least in certain regions, relative to the conveying device (3) and perpendicularly to the transport direction (2) for varying the effective width of the conveying device (3) for conveying the products, containers, and/or packaging units;
wherein a bearing (8) is provided between a first region (5) and a second region (6) of the at least one lateral guide element (4) for mechanically connecting the two regions (5, 6), wherein the bearing (8) is configured as a sliding or linear bearing and, at least in certain regions, to guide a rectilinear movement between an end region of the first region (5) and an end region of the second region (6) of the lateral guide element (4) in the longitudinal direction of the lateral guide element (4); and
wherein the bearing (8) is assigned an arresting device (9) for the selected and/or blocking of a movement of the end region of the first region (5) and of the end region of the second region (6) relative to one another.

2. The packaging machine as claimed in claim 1, wherein the transport section (1) extends at least substantially horizontally, and wherein the transport section (1) has at least one curved region or at least one bent or arcuate region through which the products, containers, and/or packing units are diverted and/or deflected in the horizontal direction, wherein, for routing the transport section (1), at least in certain regions or portions a longitudinal inclination, a curvature and/or a change of curvature of the at least one curved region or of the at least one bent or arcuate region of the transport section (1) are variably settable, in particular at least over a predetermined or predeterminable region.

3. The packaging machine as claimed in claim 1, wherein the bearing (8) is configured as a sliding or linear bearing and, at least in certain regions, to guide a rectilinear movement between an end region of the first region (5) and an end region of the second region (6) of the lateral guide element (4) in the longitudinal direction of the lateral guide element (4).

4. The packaging machine as claimed in claim 1, wherein the at least one lateral guide element (4) has a flexurally rigid third region (7), wherein the second region (6) of the lateral guide element (4) is arranged between the first and the third region (5, 7) of the lateral guide element (4).

5. The packaging machine as claimed in claim 4, wherein the first and/or third region (5, 7) of the lateral guide element (4) are/is assigned at least one adjusting device (11) via which, at least in certain regions or portions, the first and/or third region (5, 7) are/is adjustable relative to the conveying device (3) and as viewed perpendicularly to the transport direction (2).

6. The packaging machine as claimed in claim 4, wherein an end region of the second region (6) is fixedly connected to an end region of the third region (7).

7. The packaging machine as claimed in claim 1, wherein the transport section (1) is assigned two mutually opposite lateral guide elements (4) which, at least in certain regions, in particular independently of one another, are adjustable relative to the conveying device (3) and perpendicularly to the transport direction (2) for varying the effective width of the conveying device (3) for conveying the products, containers, and/or packaging units.

8. The package machine (14) as claimed in claim 1, wherein an end region of the first region (5) of the lateral guide element (4) is connected to an end region of the second region (6) of the lateral guide element (4) in such a way that, at least as required, a rectilinear movement between the end region of the first region (5) and the end region of the second region (6) is possible, wherein, selectively and/or as required, a movement of the end region of the first region (5) and of the end region of the second region (6) relative to one another is blockable.

9. An apparatus (14) for routing a transport section (1) of a packaging machine, wherein the transport section (1) has a conveying device (3), in the form of a conveyor belt, for conveying products, containers, and/or packaging units in a transport direction (2), and wherein the apparatus (14) comprises:
at least one lateral guide element (4), in the form of a guide rail or guide strip, wherein the at least one lateral guide element (4) has a flexurally rigid first region (5), in which the lateral guide element (4) runs at least substantially rectilinearly, and a second region (6), in which the lateral guide element (4) runs arcuately, wherein the second region (6) of the at least one lateral guide element (4) is formed, at least in certain regions, from a flexible material of such flexibility that, at least in certain regions or portions, a curvature and/or change of curvature of the arcuate shape of the second region (6) is variably settable, reversibly, and at least over a predetermined or predeterminable region, wherein an end region of the first region (5) of the lateral guide element (4) is connected to an end region of the second region (6) of the lateral guide element (4) in such a way that, at least as required, a rectilinear movement between the end region of the first region (5) and the end region of the second region (6) is possible, wherein, selectively and/or as required, a movement of the end region of the first region (5) and of the end region of the second region (6) relative to one another is blockable.

10. The apparatus as claimed in claim 9, wherein a bearing (8) is provided between the first region (5) and the second region (6) of the at least one lateral guide element (4) for mechanically connecting the two regions (5, 6).

11. The apparatus (14) as claimed in claim 9, wherein the at least one lateral guide element (4) has a flexurally rigid third region (7), wherein the second region (6) of the lateral guide element (4) is arranged between the first and third region (5, 7) of the lateral guide element (4), wherein, at least in certain regions or portions, the first and/or third region (5, 7) of the lateral guide element (4) are/is adjustable relative to the conveying device (3) and as viewed perpendicularly to the transport direction (2).

12. A method for routing a transport section (1) of a packaging machine, wherein the transport section (1) has a conveying device (3), in the form of a conveyor belt, for conveying products, containers, and/or packaging units in a transport direction (2), and wherein the method comprises the following method steps:

providing an apparatus (14) as claimed in claim 11; and adjusting, at least in certain regions or portions, the first and/or third region (5, 7) of the at least one lateral guide element (4) of the apparatus (14) relative to the conveying device (3) and as viewed perpendicularly to the transport direction (2) in such a way that, at least in certain regions or portions, a longitudinal inclination, a curvature and/or a change or curvature of at least one curved region or of at least one bent or arcuate region of the transport section (1) is/are set and/or, at least in certain regions or portions, an effective width of the conveying device (3), as viewed perpendicularly to the transport direction (2), for conveying the products, containers, and/or packaging units is set.

* * * * *